United States Patent
Urano (10) Patent No.: US 11,048,263 B2
(45) Date of Patent: Jun. 29, 2021

(54) AUTONOMOUS DRIVING DEVICE FOR VEHICLE

(71) Applicant: TOYOTA JIDOSHA KABUSHIKI KAISHA, Toyota (JP)

(72) Inventor: Hiromitsu Urano, Numazu (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 750 days.

(21) Appl. No.: 15/840,221

(22) Filed: Dec. 13, 2017

(65) Prior Publication Data

US 2018/0181135 A1 Jun. 28, 2018

(30) Foreign Application Priority Data

Dec. 27, 2016 (JP) .............................. JP2016-253176

(51) Int. Cl.
*G05D 1/02* (2020.01)
*G05D 1/00* (2006.01)
(Continued)

(52) U.S. Cl.
CPC ........... *G05D 1/0223* (2013.01); *B60R 25/00* (2013.01); *B60R 25/20* (2013.01); *B60W 40/08* (2013.01); *G05D 1/0055* (2013.01); *G05D 1/0088* (2013.01); *B60W 2040/0881* (2013.01); *G05D 2201/0213* (2013.01); *G08G 1/202* (2013.01)

(58) Field of Classification Search
CPC .. G05D 1/0223; G05D 1/0055; G05D 1/0088; G05D 2201/0213; B60R 25/00; B60R 25/20; B60W 40/08; B60W 2040/0881; G08G 1/202
See application file for complete search history.

(56) References Cited

U.S. PATENT DOCUMENTS 8,634,980 B1 * 1/2014 Urmson ................ B60W 50/14
701/23
2013/0110343 A1 5/2013 Ichikawa et al.
(Continued)

FOREIGN PATENT DOCUMENTS

JP 2001-001787 A 1/2001
JP 2005-170211 A 6/2005
(Continued)

*Primary Examiner* — Navid Ziaeianmehdizadeh
*Assistant Examiner* — Sean P Quinn
(74) *Attorney, Agent, or Firm* — Sughrue Mion, PLLC (57) ABSTRACT

An autonomous driving device for a vehicle includes: an actuator; and an electronic control unit configured to detect presence or absence of a driver, generate a first travel plan for causing the vehicle to travel autonomously, and generate a second travel plan by adding, to the first travel plan, a restriction including at least one of a lane change restriction and a vehicle speed restriction. The electronic control unit is configured to perform manned autonomous driving control for causing the vehicle to travel autonomously, by using the actuator, with the driver in the vehicle according to the first travel plan when the presence of the driver is detected, and perform unmanned autonomous driving control for causing the vehicle to travel autonomously, by using the actuator, with the driver not in the vehicle according to the second travel plan when the absence of the driver is detected.

15 Claims, 5 Drawing Sheets

(51) Int. Cl.
    *B60R 25/20*     (2013.01)
    *B60W 40/08*     (2012.01)
    *B60R 25/00*     (2013.01)
    *G08G 1/00*     (2006.01)

(56) References Cited

U.S. PATENT DOCUMENTS

| | | | |
|---|---|---|---|
| 2015/0066282 A1* | 3/2015 | Yopp | G05D 1/0088 |
| | | | 701/24 |
| 2016/0152224 A1 | 6/2016 | Tabata et al. | |
| 2017/0008490 A1 | 1/2017 | Sako et al. | |
| 2017/0010613 A1 | 1/2017 | Fukumoto | |
| 2017/0072906 A1* | 3/2017 | Hanson | B60R 25/06 |
| 2017/0123423 A1 | 5/2017 | Sako et al. | |
| 2018/0075565 A1* | 3/2018 | Myers | G06Q 30/02 |
| 2018/0079416 A1* | 3/2018 | Damman | B60W 10/10 |
| 2018/0081360 A1* | 3/2018 | Bostick | G06Q 10/04 |
| 2018/0093631 A1* | 4/2018 | Lee | B60R 21/01512 |

FOREIGN PATENT DOCUMENTS

| | | |
|---|---|---|
| JP | 2006-177809 A | 7/2006 |
| JP | 2011-162132 A | 8/2011 |
| JP | 5382218 B2 | 10/2013 |
| JP | 2015158467 A | 9/2015 |
| JP | 2016-088334 A | 5/2016 |
| JP | 2016102441 A | 6/2016 |
| JP | 2016-186812 A | 10/2016 |
| JP | 2016-186813 A | 10/2016 |
| WO | 2015/056530 A1 | 4/2015 |
| WO | 2015/151862 A1 | 10/2015 |
| WO | 2015166811 A1 | 11/2015 |

\* cited by examiner

AUTONOMOUS DRIVING DEVICE FOR VEHICLE

INCORPORATION BY REFERENCE

The disclosure of Japanese Patent Application No. 2016-253176 filed on Dec. 27, 2016 including the specification, drawings and abstract is incorporated herein by reference in its entirety.

BACKGROUND

1. Technical Field

The present disclosure relates to an autonomous driving device for a vehicle.

2. Description of Related Art

For example, in Japanese Patent Application Publication No. 2001-1787 (JP 2001-1787 A), a vehicle control device is described that can switch the driving state of a vehicle between autonomous driving in which a driver is present in the vehicle and autonomous driving in which a driver is not present in the vehicle.

SUMMARY

For example, while a vehicle is traveling autonomously with no driver in the vehicle, there is a risk that the vehicle will be stolen by a malicious third party since the driver is not present in the vehicle.

One aspect of the present disclosure provides an autonomous driving device that can reduce a risk of vehicle theft that may occur while the vehicle is autonomously traveling with no driver in the vehicle.

A first aspect of the present disclosure provides an autonomous driving device for a vehicle. The autonomous driving device for a vehicle according to the first aspect includes: an actuator; and an electronic control unit configured to detect presence or absence of a driver, and generate a first travel plan for causing the vehicle to travel autonomously, generate a second travel plan by adding, to the first travel plan, a restriction including at least one of a lane change restriction to prohibit a lane change of the vehicle and a vehicle speed restriction to reduce a speed of the vehicle compared to the first travel plan. The electronic control unit is configured to perform manned autonomous driving control for causing the vehicle to travel autonomously, by using the actuator, with the driver in the vehicle according to the first travel plan when the presence of the driver is detected, and perform unmanned autonomous driving control for causing the vehicle to travel autonomously, by using the actuator, with the driver not in the vehicle according to the second travel plan when the absence of the driver is detected.

According to the configuration described above, when it is detected that the driver is not present, the autonomous driving device generates a travel plan to which restrictions, such as the prohibition of a lane change, are added. Therefore, when the driver is not present, the vehicle travels autonomously according to the travel plan to which the restrictions are added. In this case, when the vehicle travels autonomously according to the travel plan to which the restriction to prohibit a lane change is added, it becomes easy to know the route along which the vehicle travels since the vehicle travels along a road-following traveling route without changing the lane. In addition, when the vehicle travels autonomously according to the travel plan to which the restriction is added to reduce the speed of the vehicle as compared to the case when it is detected that the driver is present, it takes time for the vehicle to go far from the point where the vehicle started traveling with no driver in the vehicle (start point of unmanned autonomous driving control). Therefore, even if the vehicle travels autonomously with no driver in the vehicle, it becomes easy to find the vehicle. Adding restrictions to the travel plan in this way makes it easy to find the vehicle even if the vehicle autonomously travels with no driver in the vehicle. Therefore, while the vehicle is autonomously traveling with no driver in the vehicle, the autonomous driving device can reduce the risk of vehicle theft compared to the case when there is no restriction such as the restriction to prohibit a lane change.

In the first aspect, the autonomous driving device for the vehicle may include a vehicle-dispatch signal receiver configured to receive a vehicle-dispatch signal for causing the vehicle to move to a predetermined destination. The electronic control unit may be configured to generate a third travel plan when the vehicle-dispatch signal is received by the vehicle-dispatch signal receiver during the unmanned autonomous driving control for the vehicle, and perform the unmanned autonomous driving control according to the third travel plan. The third travel plan may be a travel plan not including the restriction. The third travel plan may be a travel plan for causing the vehicle to travel toward the predetermined destination.

In the first aspect, the reception of the vehicle-dispatch signal means that a person requesting the vehicle dispatching has intentionally sent an instruction to cause the vehicle to move to the predetermined destination. Therefore, when the vehicle-dispatch signal is received, the configuration described above releases the restrictions added to the travel plan, making it possible to cause the vehicle to travel to the predetermined destination appropriately, or to the predetermined destination quickly.

In the first aspect, the electronic control unit may be configured to lock a door of the vehicle before or after a start of the unmanned autonomous driving control when the absence of the driver is detected.

According to the configuration described above, locking the doors of the vehicle when the driver is not detected makes it difficult for a third party to enter the vehicle even when the vehicle stops due to a signal, further reducing the risk of vehicle theft.

In the first aspect, the autonomous driving device for the vehicle may include a vehicle-dispatch signal receiver configured to receive a vehicle-dispatch signal for causing the vehicle to move to a predetermined destination. The electronic control unit may be configured to perform the unmanned autonomous driving control by using a third travel plan, when the vehicle-dispatch signal is received by the vehicle-dispatch signal receiver before the unmanned autonomous driving control for the vehicle is performed. The third travel plan may be a travel plan not including the restriction. The third travel plan may be a travel plan for causing the vehicle to travel toward the predetermined destination.

A second aspect of the present disclosure provides an autonomous driving device for a vehicle. The autonomous driving device for a vehicle according to the second aspect includes: an actuator; and an electronic control unit configured to detect presence or absence of a driver, and perform manned autonomous driving control according to a pre-generated travel plan when the presence of the driver is detected. The electronic control unit is configured to perform unmanned autonomous driving control according to the travel plan when the absence of the driver is detected. The manned autonomous driving control causes the vehicle to travel autonomously with the driver in the vehicle. The unmanned autonomous driving control causes the vehicle to travel autonomously with the driver not in the vehicle. The electronic control unit is configured to perform unmanned stop control for causing the vehicle to stop, by using the actuator, when a predetermined time has elapsed since a start of the unmanned autonomous driving control or when the vehicle has traveled a predetermined distance since the start of the unmanned autonomous driving control, during the unmanned autonomous driving control.

According to the configuration described above, the autonomous driving device stops the vehicle when a predetermined time has elapsed since the start of unmanned autonomous driving control or when the vehicle has traveled a predetermined distance. In this manner, by stopping the vehicle when a predetermined time has elapsed since the start of the unmanned autonomous driving control or when the vehicle has traveled a predetermined distance, the autonomous driving device prevents the vehicle from traveling far away from the point where the vehicle started traveling (starting point of unmanned autonomous driving control) with no driver in the vehicle. Therefore, even when the vehicle is traveling autonomously with no driver in the vehicle, it becomes easy to find the vehicle. Therefore, when the vehicle is autonomously traveling with no driver in the vehicle, the autonomous driving device can reduce the risk of vehicle theft compared to the case when the unmanned stop control is not performed after a predetermined time has elapsed or after the vehicle has traveled a predetermined distance.

In the second aspect, the autonomous driving device for the vehicle may include a vehicle-dispatch signal receiver configured to receive a vehicle-dispatch signal for causing the vehicle to move to a predetermined destination. The electronic control unit may be configured to generate the travel plan that causes the vehicle to travel autonomously, and generate the travel plan that causes the vehicle to travel to the predetermined destination when the vehicle-dispatch signal is received by the vehicle-dispatch signal receiver during the unmanned autonomous driving control for the vehicle. The electronic control unit may be configured to, when the vehicle-dispatch signal is received by the vehicle-dispatch signal receiver during the unmanned autonomous driving control for the vehicle, perform the unmanned autonomous driving control, according to the travel plan and not to perform the unmanned stop control.

In the second aspect, the reception of the vehicle-dispatch signal means that a person requesting the vehicle dispatching has intentionally sent an instruction to cause the vehicle to move to the predetermined destination. Therefore, when the vehicle-dispatch signal is received, this autonomous driving device does not perform the unmanned stop control above, allowing the vehicle to travel properly to the predetermined destination.

In the second aspect, the electronic control unit may be configured to lock a door of the vehicle before or after a start of the unmanned autonomous driving control when the absence of the driver is detected.

In the second aspect, the autonomous driving device for the vehicle may include a vehicle-dispatch signal receiver configured to receive a vehicle-dispatch signal for causing the vehicle to move to a predetermined destination. The electronic control unit may be configured not to perform the unmanned stop control when the vehicle-dispatch signal is received by the vehicle-dispatch signal receiver before the unmanned autonomous driving control for the vehicle is performed.

A third aspect of the present disclosure provides an autonomous driving device for a vehicle. The autonomous driving device for a vehicle according to the third aspect includes: an actuator; and an electronic control unit configured to detect presence or absence of a driver, generate a first travel plan for causing the vehicle to travel autonomously, and generate a second travel plan when the absence of the driver is detected or when an instruction to cause the vehicle to travel with the driver not in the vehicle is received. The second travel plan is generated by adding, to the first travel plan, a restriction including at least one of a lane change restriction to prohibit a lane change of the vehicle and a vehicle speed restriction to reduce a speed of the vehicle compared to the first travel plan. The electronic control unit is configured to perform unmanned autonomous driving control for causing the vehicle to travel autonomously, by using the actuator, according to the second travel plan.

In the third aspect, the autonomous driving device for the vehicle may include a vehicle-dispatch signal receiver configured to receive a vehicle-dispatch signal for causing the vehicle to move to a predetermined destination. The electronic control unit may be configured to generate a third travel plan when the vehicle-dispatch signal is received by the vehicle-dispatch signal receiver during the unmanned autonomous driving control for the vehicle, and perform the unmanned autonomous driving control according to the third travel plan. The third travel plan may be a travel plan not including the restrictions added to the second travel plan. The third travel plan may be a travel plan for causing the vehicle to travel toward the predetermined destination.

In the third aspect, the electronic control unit may be configured to lock a door of the vehicle before or after a start of the unmanned autonomous driving control when the absence of the driver is detected.

In the third aspect, the autonomous driving device for the vehicle may include a vehicle-dispatch signal receiver configured to receive a vehicle-dispatch signal for causing the vehicle to move to a predetermined destination. The electronic control unit may be configured to perform the unmanned autonomous driving control by using a third travel plan, when the vehicle-dispatch signal is received by the vehicle-dispatch signal receiver before the unmanned autonomous driving control for the vehicle is performed. The third travel plan may be a travel plan not including the restriction. The third travel plan may be a travel plan for causing the vehicle to travel toward the predetermined destination.

According to various aspects of the present disclosure, while a vehicle is autonomously traveling with no driver in the vehicle, the risk of vehicle theft can be reduced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiments of the present disclosure will be described in detail below with reference to the drawings. In the description the drawings, the same reference numeral is used for the same or equivalent component and the duplicated description is omitted.

First Embodiment

Figure 1:
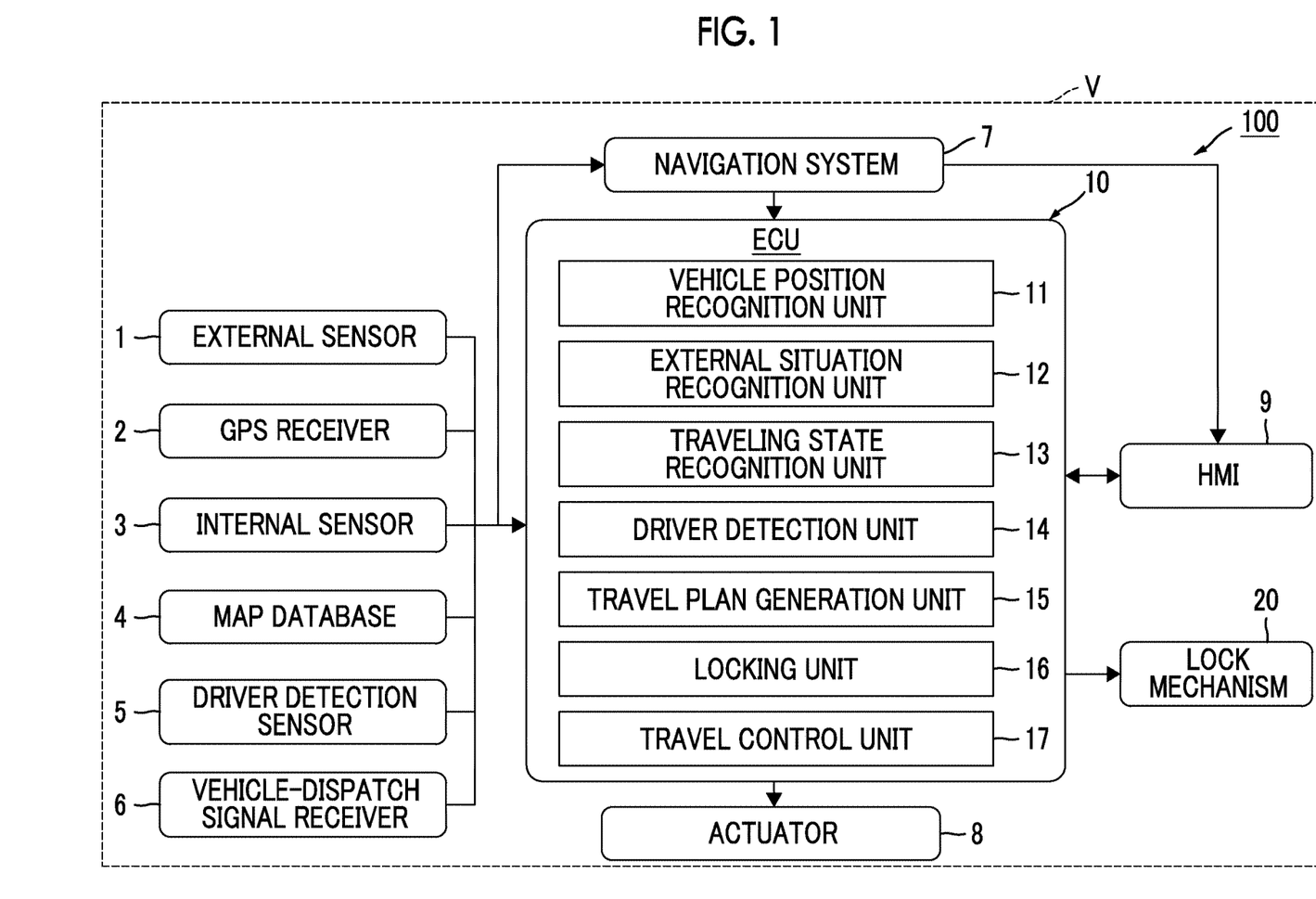
FIG. 1 is a diagram showing a general configuration of an autonomous driving device according to a first embodiment.

First, a first embodiment of an autonomous driving device will be described. As shown in FIG. 1, an autonomous driving device 100 in this embodiment, mounted in a vehicle V such as a passenger car, performs autonomous driving control for causing the vehicle V to travel autonomously according to a travel plan that is generated in advance. The state in which autonomous driving control is performed refers to the driving state in which the control, including the speed control and the steering control of the vehicle V, is performed by the autonomous driving device 100. Note that the autonomous driving device 100 can perform autonomous driving control regardless of whether or not the driver is present in the vehicle V. That is, the autonomous driving device 100 can perform two types of autonomous driving control: manned autonomous driving control and unmanned autonomous driving control. Manned autonomous driving control refers to control for causing a vehicle to autonomously travel in accordance with a travel plan with a driver in the vehicle. Unmanned autonomous driving control refers to control for causing a vehicle to autonomously travel in accordance with a travel plan with no driver in the vehicle.

As shown in FIG. 1, the autonomous driving device 100 includes an ECU 10 that performs autonomous driving control. The ECU 10 is an electronic control unit having a Central Processing Unit [CPU], a Read Only Memory [ROM], a Random Access Memory [RAM], a Controller Area Network [CAN] communication circuit, and so on. The ECU 10 implements various functions by loading a program, stored in the ROM, into the RAM and then executing the program, loaded in the RAM, by the CPU. The ECU 10 may be configured by a plurality of electronic control units. To the ECU 10, an external sensor 1, a GPS receiver 2, an internal sensor 3, a map database 4, a driver detection sensor 5, a vehicle-dispatch signal receiver 6, a navigation system 7, an actuator 8, a Human Machine Interface [HMI] 9, and a lock mechanism 20 are connected.

The external sensor 1 is a detector that detects obstacles around the vehicle V. The external sensor 1 includes at least one of a camera and a radar sensor. The camera is a capturing device for capturing the external situation of the vehicle V. The camera is provided on the interior side of the windshield of the vehicle V and on the back surface of the vehicle V. The camera may be provided on the right side and the left side of the vehicle V. The camera sends the captured information, generated by capturing the area ahead of and behind the vehicle V, to the ECU 10. The radar sensor is a detector that detects obstacles around the vehicle V using radio waves (for example, millimeter waves) or light. Examples of radar sensors include a millimeter wave radar and a Light Detection and Ranging [LIDAR]. The radar sensor sends radio waves or light to the surroundings of the vehicle V to detect an obstacle by receiving the radio waves or light reflected by the obstacle. The radar sensor sends the detected obstacle information to the ECU 10. Examples of obstacles include fixed obstacles, such as a guardrail and a building, and moving obstacles such as a pedestrian, a bicyclist, and other vehicles.

The GPS receiver 2, mounted in the vehicle V, functions as a position measurement unit that measures the position of the vehicle V. The GPS receiver 2 receives signals from three or more GPS satellites to measure the position of the vehicle V (for example, the latitude and longitude of the vehicle V). The GPS receiver 2 sends the information on the measured position of the vehicle V to the ECU 10.

The internal sensor 3 is a detector that detects the travelling state of the vehicle V and the driving operation of the driver of the vehicle V. The internal sensor 3 includes a vehicle speed sensor, an acceleration sensor, and a yaw rate sensor for detecting the traveling state of the vehicle V.

The vehicle speed sensor is a detector that detects the speed of the vehicle V. An example of the vehicle speed sensor is a wheel speed sensor that is provided on the wheels of the vehicle V, or on the drive shaft that rotates in synchronization with the wheels, to detect the rotation speed of the wheels. The vehicle speed sensor sends the detected vehicle speed information to the ECU 10. The acceleration sensor is a detector that detects the acceleration of the vehicle V. The acceleration sensor includes a longitudinal acceleration sensor for detecting the acceleration in the longitudinal direction of the vehicle V and a lateral acceleration sensor for detecting the lateral acceleration of the vehicle V. The acceleration sensor sends the acceleration information on the vehicle V to the ECU 10. The yaw rate sensor is a detector that detects the yaw rate (rotational angular velocity) around the vertical axis at the center of gravity of the vehicle V. As the yaw rate sensor, a gyro sensor may be used. The yaw rate sensor sends the detected yaw rate information on the vehicle V to the ECU 10.

The map database 4 is a database that stores map information. The map database 4 is formed in a hard disk drive (HDD) mounted in the vehicle V. The map information includes the position information on roads, the information on road shapes, the position information on intersections and branching points, and the speed limits on roads. The information on road shapes includes, for example, the information as to whether the road is a curved road or a straight road, the curvature of a curve, and the slopes of road surfaces (uphill, downhill). The map database 4 may be stored in a server that can communicate with the vehicle V.

The driver detection sensor 5 is a sensor for detecting whether a driver is seated in the driver's seat. The driver detection sensor 5 is, for example, a pressure sensor provided in the driver's seat of the vehicle V. For example, this pressure sensor detects the weight of a driver sitting on the seating surface of the driver's seat. The driver detection sensor 5 sends the detected detection information to the ECU 10.

The vehicle-dispatch signal receiver 6 receives the vehicle-dispatch signal that causes the vehicle V to move to a predetermined destination. The vehicle-dispatch signal receiver 6 receives the vehicle-dispatch signal, for example, via wireless communication. This vehicle-dispatch signal is delivered from facilities, such as a signal distribution center, installed outside the vehicle V. The vehicle-dispatch signal may be delivered also via a portable communication device operated by the owner of the vehicle V. The vehicle-dispatch signal may include the information on a destination to which the vehicle V is to move. Another configuration is also possible in which the information on a destination, to which the vehicle V is to move, is preset in the autonomous driving device 100 and, when the vehicle-dispatch signal receiver 6 receives the vehicle-dispatch signal, the vehicle V is moved to the preset destination.

The navigation system 7, mounted in the vehicle V, sets a target route along which the vehicle V will travel autonomously. The navigation system 7 calculates the target route from the position of the vehicle V to the destination, based on the preset destination, the position of vehicle V measured by the GPS receiver 2, and the map information stored in the map database 4. The destination of autonomous driving control is set by an occupant of vehicle V by operating an input button (or touch panel) provided in the navigation system 7. The target route is set by identifying the lanes of the road. The navigation system 7 can use a known method to set the target route. The navigation system 7 outputs displays on the display, and voices from the speaker, to notify the driver about the target route. The navigation system 7 outputs the information on the target route of the vehicle V to the ECU 10.

The actuator 8 is a device for controlling the traveling of the vehicle V. The actuator 8 at least includes a throttle actuator, a brake actuator, and a steering actuator. The throttle actuator controls the amount of air to be supplied to the engine (throttle angle) in response to the control signal from the ECU 10 for controlling the driving force of the vehicle V. When the vehicle V is a hybrid vehicle, the control signal is input from the ECU 10 not only to the engine to control the amount of air to be supplied to the engine, but also to the motor that works as the power source, for controlling the driving force. When the vehicle V is an electric vehicle, the control signal is input from the ECU 10 to the motor that works as the power source for controlling the driving force. The motor used as the power source in these cases constitutes the actuator 8.

The brake actuator controls the brake system in response to the control signal from the ECU 10 for controlling the braking force to be applied to the wheels of the vehicle V. For example, a hydraulic brake system can be used as the brake system. The steering actuator controls the driving of the assist motor, which controls the steering torque in the electric power steering system, in response to the control signal from the ECU 10. Thus, the steering actuator controls the steering torque of the vehicle V. [0038] The HMI 9 is an interface for inputting and outputting information between the driver and the autonomous driving device 100. The HMI 9 includes, for example, a display for displaying image information to the driver, a speaker that outputs voices, an operation button or a touch panel through which the driver performs an input operation, and a voice input device. The HMI 9 sends the information, received from the driver, to the ECU 10. The HMI 9 displays image information on the display, and outputs voices from the speaker, in response to the control signal from the ECU 10.

The lock mechanism 20, provided on the doors of the vehicle V, locks the doors. The doors of the vehicle V, each provided in an opening between the inside of the vehicle and the outside of the vehicle, include a door provided in the cabin in which the occupants of the vehicle V ride and a door provided in the trunk in which baggage is stored. The lock mechanism 20, when locked, prevents the opening of the doors of the vehicle V. The lock mechanism 20, when unlocked, allows the opening of the doors of the vehicle V.

Next, the functional configuration of the ECU 10 will be described. The ECU 10 includes a vehicle position recognition unit 11, an external situation recognition unit 12, a traveling state recognition unit 13, a driver detection unit 14, a travel plan generation unit 15, a locking unit 16, and a travel control unit 17. Note that a part of the functions of the ECU 10 may be executed by a server capable of communicating with the vehicle V.

The vehicle position recognition unit 11 recognizes the position of the vehicle V on the map based on the position information received by the GPS receiver 2 and the map information stored in the map database 4. The vehicle position recognition unit 11 may also recognize the position of the vehicle V using the existing SLAM technology, based on the position information on the fixed obstacles such as utility poles and so on, included in the map information stored in the map database 4, and the detection result of the external sensor 1.

The external situation recognition unit 12 recognizes the external situation of the vehicle V based on the detection result of the external sensor 1. The external situation recognition unit 12 uses a known method to recognize the external situation of the vehicle V, including the positions of obstacles around the vehicle V, based on the images captured by the camera and/or the obstacle information sensed by the radar sensor.

The traveling state recognition unit 13 recognizes the traveling state of the vehicle V, including the vehicle speed and the direction of the vehicle V, based on the detection result of the internal sensor 3. More specifically, the traveling state recognition unit 13 recognizes the vehicle speed of the vehicle V based on the vehicle speed information sensed by the vehicle speed sensor. Similarly, the traveling state recognition unit 13 recognizes the direction of the vehicle V based on the yaw rate information sensed by the yaw rate sensor.

The driver detection unit 14 detects whether a driver is present in the driver's seat, based on the detection result of the driver detection sensor 5. For example, when the weight of the driver is detected by the pressure sensor of the driver detection sensor 5, the driver detection unit 14 detects that the driver is present. Conversely, when the weight of the driver is not detected by the pressure sensor of the driver detection sensor 5, the driver detection unit 14 detects that the driver is not present.

The travel plan generation unit 15 generates a travel plan for causing the vehicle V to travel autonomously. More specifically, the travel plan generation unit 15 first sets the target route of the vehicle V, based on the preset destination, the position of the vehicle V on the map recognized by the vehicle position recognition unit 11, and the map information stored in the map database 4. The destination may be a destination that is set by the driver or may be a destination that is set automatically by the autonomous driving device 100 using a known method. As the target route, the travel plan generation unit 15 may use the target route that is set by the navigation system 7.

Target routes described in this specification also include a traveling route that is automatically generated based on the external situation and the map information when the driver does not explicitly set a destination. An example of such a traveling route is a road-following traveling route described in "Driving Assistance Device" (Japanese Patent No. 5382218 (WO2011/158347)) or in "Autonomous Driving Device" (Japanese Patent Application Publication No. 2011-162132 (JP 2011-162132 A)).

The travel plan generation unit 15 generates a travel plan for the vehicle V, based on the target route that is set as described above, the map information stored in the map database 4, the external situation of the vehicle V recognized by the external situation recognition unit 12, and the traveling state of the vehicle V recognized by the traveling state recognition unit 13. The travel plan generation unit 15 starts generating a travel plan when the driver performs the start operation of autonomous driving control. This travel plan is a travel plan for the vehicle V to travel from the current position of the vehicle V to the preset destination. When the driver does not explicitly set a destination, this travel plan is a travel plan for the vehicle V to travel from the current position of the vehicle V along a road-following traveling route.

A travel plan includes the control target value of the vehicle V for a position on the target route of the vehicle V. The positions on the target route are positions in the extending direction of the target route on the map. The positions on the target route mean the set longitudinal positions that are set at predetermined intervals (for example, at one-meter intervals) in the extending direction of the target route. The control target value is the value of a control target of the vehicle V in the travel plan. The control target value is set in association with each set longitudinal position on the target route. The travel plan generation unit 15 generates a travel plan by setting the set longitudinal positions at predetermined intervals on the target route and, at the same time, by setting the control target value (for example, the target lateral position and the target vehicle speed) for each set longitudinal position. The set longitudinal position and the target lateral position may be set by combining them into one set of positional coordinates. The set longitudinal position and the target lateral position mean the longitudinal position information and the lateral position information that are set as a target in the travel plan.

Furthermore, when the driver detection unit 14 detects that the driver is not present, the travel plan generation unit 15 adds at least one of the following two restrictions to the travel plan when generating a travel plan as described above: a restriction to prohibit the vehicle V from changing the lane and a restriction to reduce the speed of the vehicle V compared to the case when the driver detection unit 14 detects that the driver is present. In other words, the travel plan generated as described above (travel plan without restriction) is a travel plan that is generated when the driver detection unit 14 detects that the driver is present.

The generation of a travel plan to which a restriction to prohibit a lane change is added refers to the generation of a travel plan that causes the vehicle V to travel toward the destination without changing the lane while traveling on a road with multiple lanes. It should be noted that the lane changes prohibited in this case may exclude a lane change for entering the right turning lane for a right turn, or for entering the left turning lane for a left turn, while traveling toward the destination. In other words, a lane change for entering the right turning lane for a right turn, or for entering the left turning lane for a left turn, need not be restricted. For example, the prohibited lane changes may include a lane change to a lane with a smaller number of traveling vehicles and a lane change when overtaking a vehicle ahead of the vehicle.

The generation of a travel plan to which a restriction is added to reduce the speed of the vehicle V compared to the case when the driver is detected refers to the generation of a travel plan in which a speed lower than that of the case when a driver is detected is set. For example, when it is detected that the driver is present, the legal speed of the road on which the vehicle V travels may be set as the speed of the vehicle V. In this case, the travel plan generation unit 15 generates a travel plan in which a value less than the legal speed is set as the speed of the vehicle V.

The generation of a travel plan to which both restrictions (that is, a restriction to prohibit a lane change and a restriction to reduce the speed of the vehicle V compared to the case when the driver is detected) are added refers to the generation of a travel plan in which the restriction to prohibit a lane change and the restriction to reduce the speed of the vehicle V are combined.

In this way, when it is detected that the driver is present, the travel plan generation unit 15 generates a travel plan, to which the above-described restriction(s) is not added, as a travel plan to be used for manned autonomous driving control. Conversely, when it is detected that the driver is not present, the travel plan generation unit 15 generates a travel plan, to which the above restriction(s) is added, as a travel plan to be used for unmanned autonomous driving control.

In addition, when the vehicle-dispatch signal is received by the vehicle-dispatch signal receiver 6 while the travel control unit 17 is performing unmanned autonomous driving control for the vehicle V, the travel plan generation unit 15 releases the restriction added to the travel plan and generates a travel plan to cause the vehicle to travel to the predetermined destination. A travel plan generated by the travel plan generation unit 15 when the vehicle-dispatch signal is received is referred to as a vehicle-dispatch travel plan for convenience sake in order to distinguish it from other travel plans.

The restrictions that are released in this case is the restriction to prohibit a lane change and the restriction to reduce the speed of the vehicle V compared to the case when the driver is detected. If one of these two restrictions is added, the restriction added to the travel plan is released. If both restrictions are added to the travel plan, both restrictions are released.

The predetermined destination of a travel plan, generated when the vehicle-dispatch signal is received, is the location of the movement destination to which the vehicle V is to be moved for vehicle dispatching. When the information on the destination, which is the movement destination, is included in the vehicle-dispatch signal, the destination included in the vehicle-dispatch signal can be used as the predetermined destination. When the information on the destination, which is the movement destination when the vehicle-dispatch signal is received, is preset in the autonomous driving device 100, the preset destination can be used as the predetermined destination. The travel plan generation unit 15 generates a travel plan by setting the target route as described above with the movement destination, which is used when the vehicle-dispatch signal is received, as the destination.

The locking unit 16 locks the doors of the vehicle V by controlling the lock mechanism 20. If it is detected by the driver detection unit 14 that the driver is not present, the locking unit 16 locks the doors before or after unmanned autonomous driving control is started by the travel control unit 17. Note that the time after the start of unmanned autonomous driving control is a time at which a predetermined time has elapsed since the start of unmanned autonomous driving control, for example, immediately after the start of unmanned autonomous driving control. When locking the doors after the start of unmanned autonomous driving control, the locking unit 16 locks the doors after the start of unmanned autonomous driving control regardless of the speed of the vehicle V. That is, even if the speed of the vehicle V is low, the doors are locked after a predetermined time elapses.

The locking unit 16 locks the doors in this way to prevent a third party from entering the vehicle V from outside the vehicle V during unmanned autonomous driving control. The locking unit 16 may lock the doors and, at the same time, close the windows. The locking unit 16 may allow the doors to be unlocked from inside the vehicle V. This allows a person who remains in the vehicle V to leave the vehicle V.

If, after the doors are locked, a person tries to unlock a door of the vehicle V using the regular key, the locking unit 16 may unlock the door. In this case, the unlocking operation of a door of the vehicle V using the regular key may be either an unlocking operation using the physical key or an unlocking operation via wireless communication. If a person unlocks a door using the regular key during unmanned autonomous driving control, the travel control unit 17 may suspend or release the unmanned autonomous driving control for the vehicle V. This makes it possible to prevent the vehicle V from traveling with the doors opened (with the vehicle V in the state in which the doors can be opened or closed). This also achieves the effect of stopping autonomous driving, which is under control of unmanned autonomous driving control, by an operation from outside the vehicle V as well as the effect of prohibiting the erroneous start of the vehicle V. The autonomous driving device 100 may suspend unmanned autonomous driving control for vehicle V, or may release the execution of unmanned autonomous driving control, when a door is unlocked from inside the vehicle V during unmanned autonomous driving control.

The travel control unit 17 performs autonomous driving control, including the speed control and the steering control of the vehicle V, when the driver performs an input operation to switch the driving state of the vehicle V to the autonomous driving state, based on the position of the vehicle V on the map recognized by the vehicle position recognition unit 11 and on the travel plan generated by the travel plan generation unit 15. The travel control unit 17 sends the control signal to the actuator 8 to perform autonomous driving control. The driving state of the vehicle V enters the autonomous driving state when the travel control unit 17 performs autonomous driving control. As described above, the travel plan generation unit 15 generates a travel plan regardless of whether the driver is present in the vehicle V or not. This enables the travel control unit 17 to perform autonomous driving control according to the travel plan, thus allowing the execution of both manned autonomous driving control when the driver is present in the vehicle V and unmanned autonomous driving control when the driver is not present.

If it is detected by the driver detection unit 14 that the driver is present, the travel control unit 17 performs manned autonomous driving control according to the travel plan generated by the travel plan generation unit 15. If it is detected by the driver detection unit 14 that the driver is not present, the travel control unit 17 performs unmanned autonomous driving control according to the travel plan generated by the travel plan generation unit 15.

That is, if it is detected by the driver detection unit 14 that the driver is not present, the travel control unit 17 performs unmanned autonomous driving control according to the travel plan to which the restrictions described above are added. As a result, when the driver is not present, the vehicle V travels autonomously according to the travel plan that includes at least one of the restriction to prohibit a lane change and the restriction to reduce the speed as compared to the case when a driver is present.

In addition, when the vehicle-dispatch signal is received by the vehicle-dispatch signal receiver 6 during the unmanned autonomous driving control of the vehicle V, the travel control unit 17 performs the unmanned autonomous driving control of the vehicle V according to a vehicle-dispatch travel plan. A travel plan generated by the travel plan generation unit 15 when the vehicle-dispatch signal is received is a travel plan in which the restrictions, such as the restriction to prohibit a lane change, are released and which causes the vehicle V to travel to the destination that is the movement destination to which the vehicle V is to be moved for vehicle dispatching.

If it is detected by the driver detection unit 14 that the driver is not present when the driving state of the vehicle V is switched to the autonomous driving state by a driver's input operation, the travel control unit 17 performs unmanned autonomous driving control according to the travel plan to which the above restrictions are added. In addition, if it is detected by the driver detection unit 14 during manned autonomous driving control that the driver is not present, the travel control unit 17 may perform unmanned autonomous driving control according to the travel plan to which the above restrictions are added; conversely, if it is detected by the driver detection unit 14 during unmanned autonomous driving control that the driver is present, the travel control unit 17 may perform manned autonomous driving control according to the travel plan in which the restrictions described above are released.

Next, the flow of the processing will be described in which the travel plan generation unit 15 generates a travel plan based on the detection result of the driver detection unit 14 when the driving state of the vehicle V is switched to the autonomous driving state by a driver's input operation. The flowchart shown in FIG. 2 is started when the operation state of the vehicle V is switched to the autonomous driving state.

Figure 2:
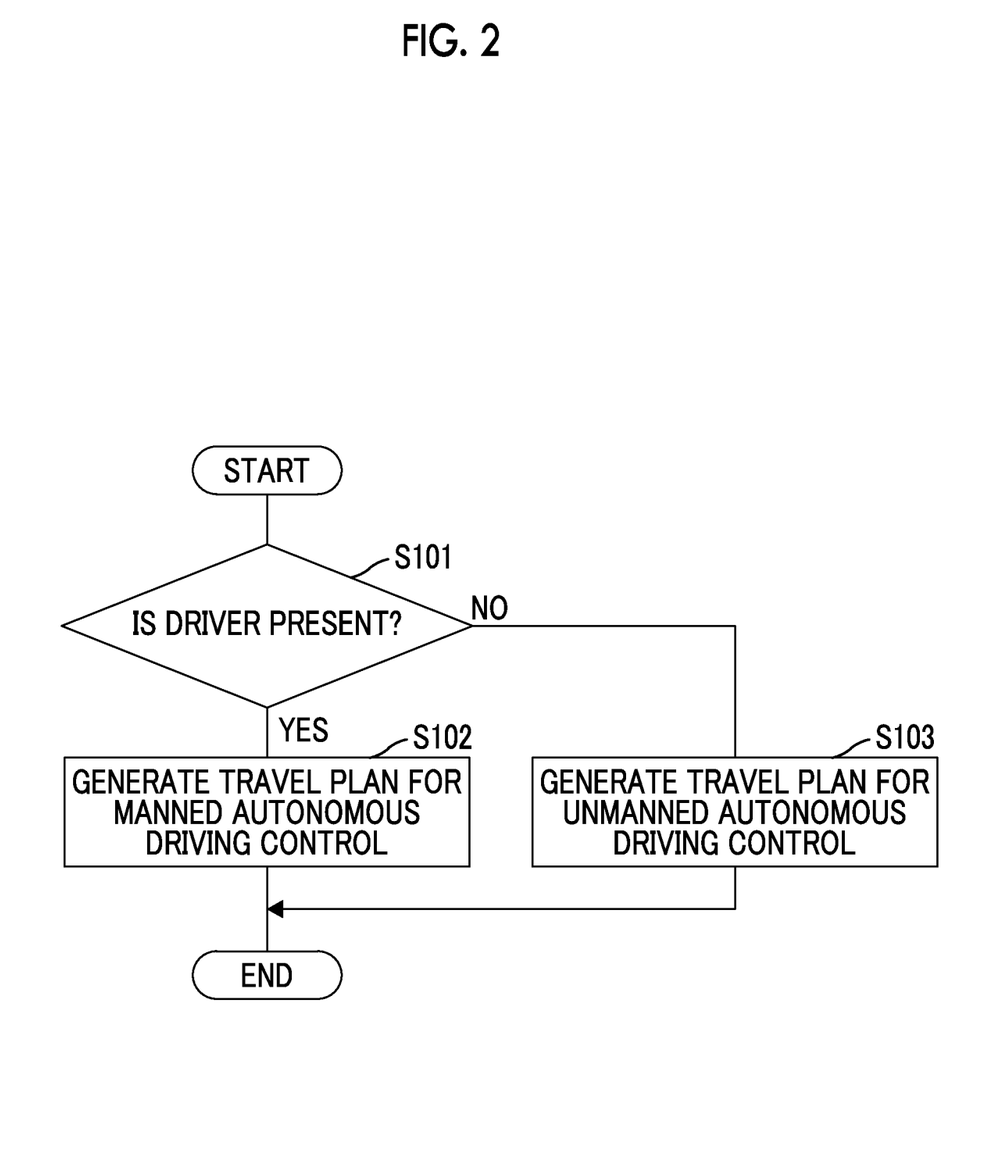
FIG. 2 is a flowchart showing a flow of processing in which a travel plan generation unit generates a travel plan in accordance with the detection result of a driver detection unit.

As shown in FIG. 2, the travel plan generation unit 15 determines whether the driver is detected by the driver detection unit 14 (S101). If it is detected that the driver is present (S101: YES), the travel plan generation unit 15 generates a travel plan, to which the above-described restrictions such as the restriction to prohibit a lane change, are not added, as a travel plan for manned autonomous driving control (S102). On the other hand, if it is detected that the driver is not present (S101: NO), the travel plan generation unit 15 generates a travel plan, to which the above-described restrictions such as the restriction to prohibit a lane change are added, as a travel plan for unmanned autonomous driving control (S103). When the travel plan is generated, the travel control unit 17 performs manned autonomous driving control or unmanned autonomous driving control according to the generated travel plan.

Figure 3:
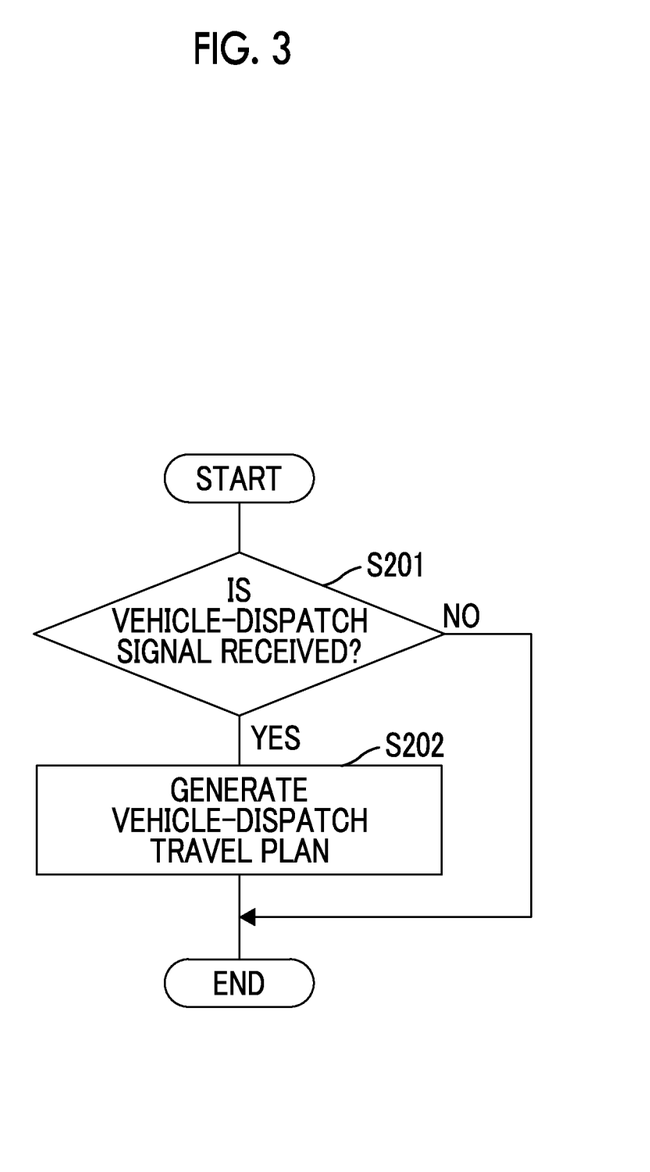
FIG. 3 is a flowchart showing a flow of processing for generating a vehicle-dispatch travel plan.

Next, the flow of the processing for generating a vehicle-dispatch travel plan when the vehicle-dispatch signal is received during the unmanned autonomous driving control of the vehicle V will be described. The flowchart shown in FIG. 3 is started when the unmanned autonomous driving control of the vehicle V (except unmanned autonomous driving control for vehicle dispatching) is started. If the vehicle V is still under unmanned autonomous driving control when the processing reaches the end, the processing is started from the start again after a predetermined time elapses.

As shown in FIG. 3, the travel plan generation unit 15 determines whether the vehicle-dispatch signal is received by the vehicle-dispatch signal receiver 6 (S201). If the vehicle-dispatch signal is not received (S201: NO), the travel control unit 17 performs the processing in S201 again after a predetermined time elapses. If the vehicle-dispatch signal is received (S201: YES), the travel plan generation unit 15 releases the restrictions added to the travel plan and generates a travel plan that causes the vehicle V to move to the movement destination for vehicle dispatching (S202). When the vehicle-dispatch travel plan is generated by the travel plan generation unit 15, the travel control unit 17 performs the unmanned autonomous driving control of the vehicle V according, not to instead of the travel plan to which the above-described restrictions, such as the restriction to prohibit a lane change, are added, but to the vehicle-dispatch travel plan.

This embodiment is configured as described above. If it is detected that the driver is not present, this autonomous driving device 100 generates a travel plan to which restrictions, such as the prohibition of a lane change, are added. Therefore, if the driver is not present, the vehicle V travels autonomously according to the travel plan to which the restrictions are added. In this case, when the vehicle V travels autonomously according to the travel plan to which the restriction to prohibit a lane change is added, it becomes easy to know the route along which the vehicle V travels since the vehicle V travels without changing the lane. In addition, when the vehicle V travels autonomously according to the travel plan to which the restriction is added to reduce the speed of the vehicle V as compared to the case when it is detected that the driver is present, it takes time for the vehicle V to go far from the point where the vehicle V started traveling with no driver in the vehicle (start point of unmanned autonomous driving control). Therefore, even if the vehicle V travels autonomously with no driver in the vehicle V, it becomes easy to find the vehicle V. Adding restrictions to the travel plan in this way makes it easy to find the vehicle V even if the vehicle V autonomously travels with no driver in the vehicle V. Therefore, when the vehicle V is autonomously traveling with no driver in the vehicle (that is, during unmanned autonomous driving control), the autonomous driving device 100 can reduce the risk of theft of the vehicle V compared to the case when there is no restriction such as the restriction to prohibit a lane change.

When the vehicle-dispatch signal is received during unmanned autonomous driving control of the vehicle V, the travel plan generation unit 15 releases the restrictions added to the travel plan and generates a travel plan that causes the vehicle V to travel to the destination that is the movement destination to which the vehicle V is to be moved for destination. In this case, the reception of the vehicle-dispatch signal means that a person requesting the vehicle dispatching has intentionally sent an instruction to cause the vehicle V to move to the predetermined destination. Therefore, when the vehicle-dispatch signal is received, this configuration releases the restrictions added to the travel plan, making it possible to cause the vehicle V to travel to the predetermined destination appropriately, or to the predetermined destination quickly.

If it is detected by the driver detection unit 14 that the driver is not present, the locking unit 16 locks the doors before or after the start of unmanned autonomous driving control. Locking the doors of the vehicle V in this way when the driver is not detected makes it difficult for a third party to enter the vehicle even when the vehicle V stops due to a signal, further reducing the risk of the theft of the vehicle V.

Second Embodiment

Next, a second embodiment of an autonomous driving device will be described. In the description of the second embodiment, the same reference numeral is used for the same component as that of the first embodiment and the duplicated description is omitted. An autonomous driving device 100A in this embodiment shown in FIG. 4 can perform manned autonomous driving control and unmanned autonomous driving control in the same way as the autonomous driving device 100 in the first embodiment. The autonomous driving device 100A is different from the autonomous driving device 100 in the first embodiment in the configuration of a travel plan generation unit 15A and a travel control unit 17A. The travel plan generation unit 15A and the travel control unit 17A will be described in detail below.

Figure 4:
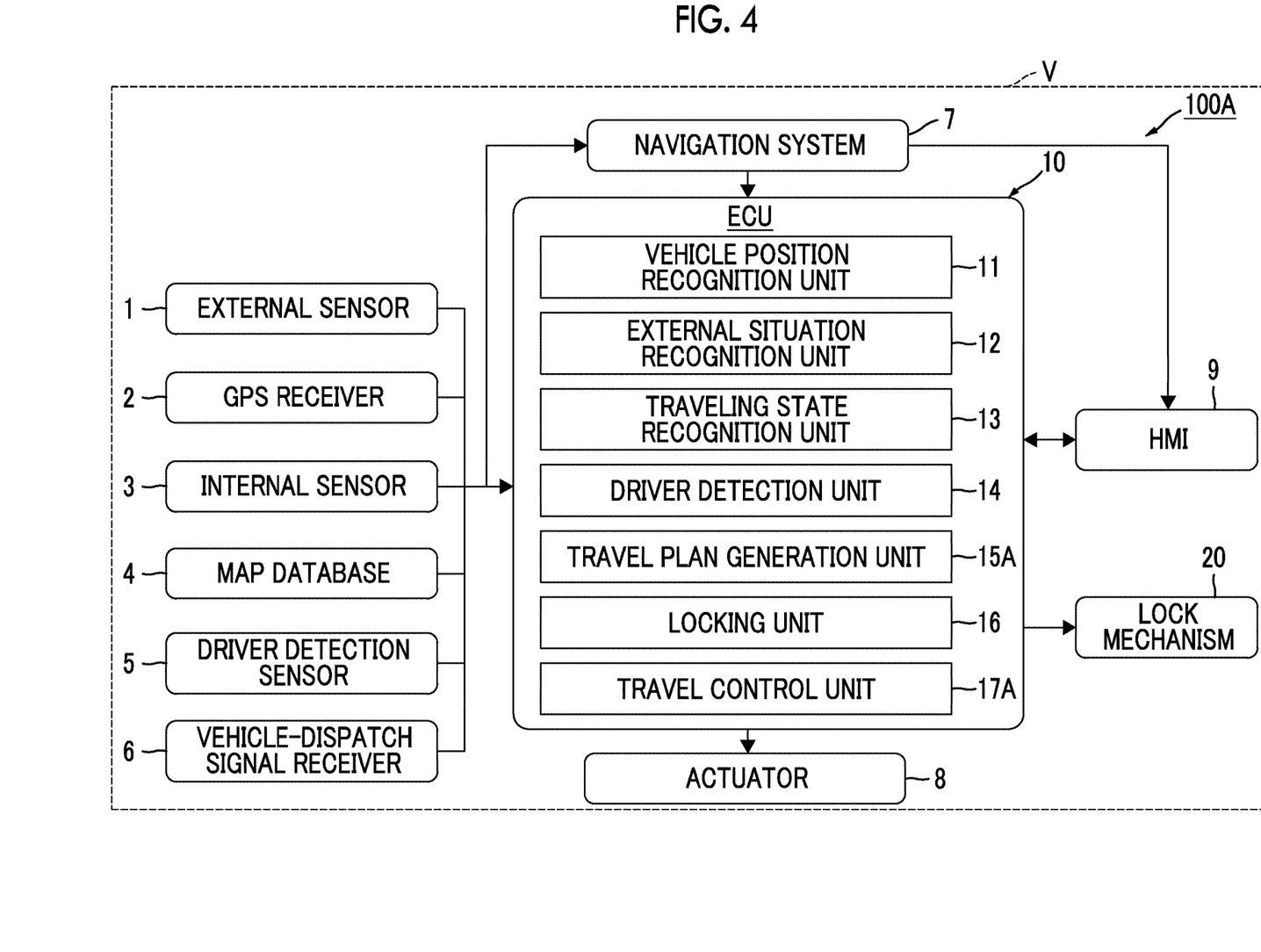
FIG. 4 is a diagram showing a general configuration of an autonomous driving device according to a second embodiment.

The travel plan generation unit 15A generates a travel plan for causing the vehicle V to travel autonomously. As with the travel plan generation unit 15 in the first embodiment, the travel plan generation unit 15A sets the target route of vehicle V based on the preset destination, the position of the vehicle V on the map recognized by the vehicle position recognition unit 11, and the map information stored in the map database 4. As described above, target routes include a traveling route that is automatically generated based on the external situation and the map information when the driver does not explicitly set a destination. The travel plan generation unit 15A generates a travel plan for the vehicle V, based on the target route, the map information stored in the map database 4, the external situation of the vehicle V recognized by the external situation recognition unit 12, and the traveling state of the vehicle V recognized by the traveling state recognition unit 13.

The travel plan generation unit 15 in the first embodiment generates a travel plan to which restrictions, such as the restriction to prohibit a lane change, are added if it is detected by the driver detection unit 14 that the driver is not present. On the other hand, the travel plan generation unit 15A in this embodiment generates a travel plan to which restrictions, such as the restriction to prohibit a lane change, are not added regardless of whether or not the driver is present.

In addition, the travel plan generation unit 15A generates a travel plan that causes the vehicle V to travel toward the predetermined destination when the vehicle-dispatch signal is received by the vehicle-dispatch signal receiver 6 while the travel control unit 17A is performing the unmanned autonomous driving control for the vehicle V. The predetermined destination in this case is the location of the movement destination to which the vehicle V is to be moved for vehicle dispatching. A travel plan generated by the travel plan generation unit 15A when the vehicle-dispatch signal is received is referred to as a vehicle-dispatch travel plan for convenience sake in order to distinguish it from other travel plans.

The travel control unit 17A performs manned autonomous driving control according to the travel plan generated by the travel plan generation unit 15A if it is detected by the driver detection unit 14 that the driver is present. On the other hand, the travel control unit 17A performs unmanned autonomous driving control according to the travel plan generated by the travel plan generation unit 15A if it is detected by the driver detection unit 14 that the driver is not present.

Furthermore, the travel control unit 17A performs unmanned stop control to stop the vehicle V when a predetermined time has elapsed since the start of unmanned autonomous driving control during unmanned autonomous driving control. Alternatively, the travel control unit 17A may perform unmanned stop control to stop the vehicle V when the vehicle V has traveled a predetermined distance since the start of unmanned autonomous driving control during unmanned autonomous driving control. In this case, the travel control unit 17A can determine whether the vehicle V has traveled a predetermined distance from the start of unmanned autonomous driving control, based on a known technology, for example, based on the detection result of the traveling distance sensor mounted in the vehicle V.

The unmanned stop control described above is a control operation to move the vehicle V to a place where the traveling of other vehicles is not disturbed and, then, to stop the vehicle V when a predetermined time has passed or when the vehicle V has traveled a predetermined distance. Examples of places where the traveling of other vehicles is not disturbed include a road shoulder and a space on the side of the road. The travel control unit 17A moves the vehicle V to a place, where the traveling of other vehicles is not disturbed, based a known technology and, after that, stops the vehicle V when a predetermined time has elapsed since the start of unmanned autonomous driving control or when the vehicle V has traveled a predetermined distance. After stopping the vehicle V by the unmanned stop control, the travel control unit 17A ends the unmanned autonomous driving control.

Note that, when a destination is set in the travel plan that is used when performing unmanned autonomous driving control, the vehicle V sometimes arrives at the destination before the predetermined time elapses since the start of unmanned autonomous driving control or before the vehicle travels the predetermined distance. In such a case, the travel control unit 17A does not perform the unmanned stop control.

When the vehicle-dispatch signal is received by the vehicle-dispatch signal receiver 6 during unmanned autonomous driving control for the vehicle V, the travel control unit 17A performs unmanned autonomous driving control for the vehicle V according to the vehicle-dispatch travel plan. In addition, when the vehicle-dispatch signal is received by the vehicle-dispatch signal receiver 6 during unmanned autonomous driving control for the vehicle V, the travel control unit 17A does not perform unmanned stop control. This allows the vehicle V to travel autonomously, under unmanned autonomous driving control, to the destination for vehicle dispatching.

Figure 5:
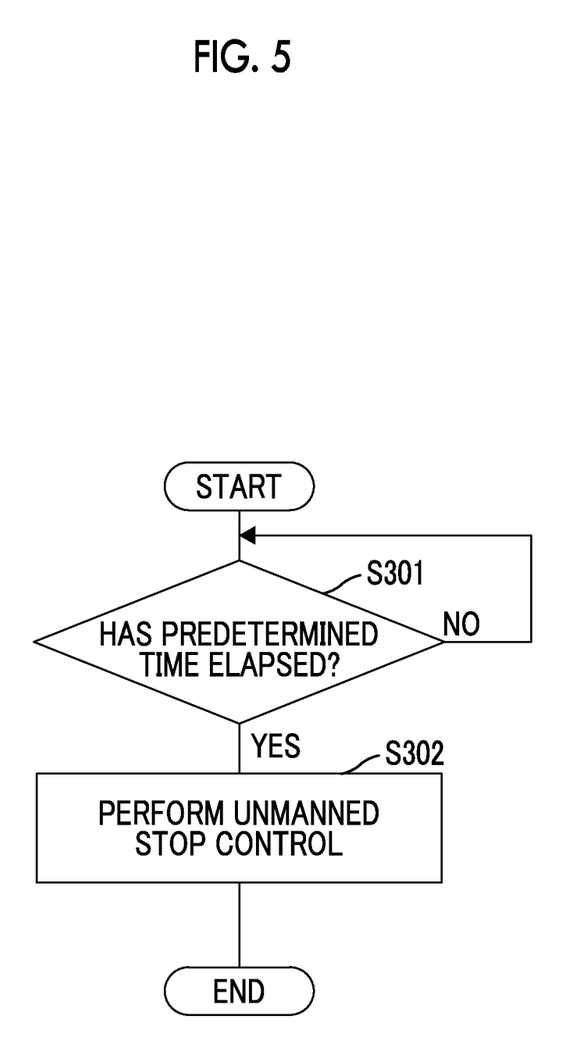
FIG. 5 is a flowchart showing a flow of processing in which a travel control unit performs unmanned stop control during unmanned autonomous driving control.

Next, the flow of the processing in which the travel control unit 17A performs unmanned stop control during unmanned autonomous driving control will be described. The flowchart shown in FIG. 5 is started when unmanned autonomous driving control (except unmanned autonomous driving control for vehicle dispatching) for the vehicle V is started. When a destination is set in the travel plan to be used when performing unmanned autonomous driving control and, in this case, when the vehicle V arrives at the destination before the predetermined time elapses from the start of unmanned autonomous driving control or before the vehicle V travels the predetermined distance, the processing of this flowchart is terminated.

As shown in FIG. 5, the travel control unit 17A determines whether a predetermined time has elapsed since the start of unmanned autonomous driving control (S301). If the predetermined time has not elapsed (S301: NO), the travel control unit 17A repeatedly executes the determination processing in S301 until the predetermined time elapses. When the determination is made whether the vehicle V has traveled a predetermined distance instead of whether a predetermined time has elapsed, the travel control unit 17A determines whether the vehicle V has traveled the predetermined distance from the start of unmanned autonomous driving control. The travel control unit 17A repeatedly executes this determination processing until the vehicle V travels the predetermined distance.

If the predetermined time has elapsed (S301: YES), the travel control unit 17A performs the unmanned stop control to stop the vehicle V (S302). When the determination is made whether the vehicle V has traveled a predetermined distance instead of whether a predetermined time has elapsed, the travel control unit 17A performs the unmanned stop control to stop the vehicle V when the vehicle V has traveled the predetermined distance.

The flow of the processing in which the travel plan generation unit 15A generates a vehicle-dispatch travel plan when the vehicle-dispatch signal is received and then the travel control unit 17A performs unmanned autonomous driving control for the vehicle V according to the generated vehicle-dispatch travel plan is similar to the flow of processing in the first embodiment described with reference to FIG. 3.

This embodiment is configured as described above. The autonomous driving device 100A stops the vehicle V when a predetermined time has elapsed since the start of unmanned autonomous driving control or when the vehicle has traveled a predetermined distance. In this manner, by stopping the vehicle V when a predetermined time has elapsed since the start of the unmanned autonomous driving control or when the vehicle V has traveled a predetermined distance, the autonomous driving device 100A prevents the vehicle V from traveling far away from the point where the vehicle V started traveling (starting point of unmanned autonomous driving control) with no driver in the vehicle. Therefore, even when the vehicle V is traveling autonomously with no driver in the vehicle V, it becomes easy to find the vehicle V. This means that, when the vehicle V is traveling autonomously with no driver in the vehicle, the autonomous driving device can reduce the risk of theft of the vehicle V compared to the case when the unmanned stop control is not performed after a predetermined time has elapsed or after the vehicle V has traveled a predetermined distance.

When the vehicle-dispatch signal is received during unmanned autonomous driving control for the vehicle V, the travel plan generation unit 15A generates a travel plan that causes the vehicle V to travel to the destination that is the movement destination to which the vehicle V is to be moved for vehicle dispatching. When the vehicle-dispatch signal is received during unmanned autonomous driving control for the vehicle V, the travel control unit 17A performs unmanned autonomous driving control according to the vehicle-dispatch travel plan and does not perform the unmanned stop control. In this case, the reception of the vehicle-dispatch signal means that a person requesting the vehicle dispatching has intentionally sent an instruction to cause the vehicle V to move to the predetermined destination. Therefore, when the vehicle-dispatch signal is received, this autonomous driving device does not perform the unmanned stop control above, allowing the vehicle V to travel properly to the predetermined destination.

If it is detected by the driver detection unit 14 that the driver is not present, the locking unit 16 locks the doors before or after the start of unmanned autonomous driving control. Locking the doors of the vehicle V in this way when the driver is not detected makes it difficult for a third party to enter the vehicle even when the vehicle V stops due to a signal, further reducing the risk of the theft of the vehicle V.

The embodiments of the present disclosure have been described above. However, the present disclosure is not limited to the above embodiments. For example, the autonomous driving devices 100 and 100A may have a drive recorder. This drive recorder stores observation data when autonomous driving control for the vehicle V is performed. This observation data is, for example, data in which the detection result of the external sensor 1, the detection result of the internal sensor 3, the detection result of the driver detection sensor 5 are associated with the time of day and the position of the vehicle V. By recording the observation data in this way, it is possible to know the situation when the theft of the vehicle V occurs. In addition, the observation data may be recorded not only in the drive recorder provided in the autonomous driving devices 100 and 100A but also in an information recording center outside the vehicle through a communication line. Recording the observation data outside the vehicle can maintain the robustness of the observation data. When the observation data cannot be recorded because the drive recorder is not mounted or the drive recorder does not function properly, the autonomous driving devices 100 and 100A may also make it impossible to perform autonomous driving control. The drive recorder may record only the observation data for a predetermined time (for example, several minutes) after the start of autonomous driving control. Furthermore, the drive recorder may be configured to record observation data as necessary, for example, when a predetermined recording condition is satisfied.

The driver detection sensor 5 may have a camera, which captures the driver, in place of the pressure sensor. This camera is provided, for example, on the cover of the steering column of the vehicle V, and in the front of the driver, for capturing the driver. In this case, the driver detection unit 14 can detect presence or absence of the driver using a known image processing technology, based on the image information captured by the camera.

In the autonomous driving devices 100 and 100A in the first embodiment and the second embodiment, it is not always required that unmanned autonomous driving control for the vehicle V be performed in response to the vehicle-dispatch signal. Moreover, the vehicle-dispatch signal may be received not during unmanned autonomous driving control for the vehicle V, but while the vehicle V stops. In this case, the vehicle V can travel by using a travel plan in which the restrictions are added, or can be stopped by the unmanned stop control. In addition, in the autonomous driving devices 100 and 100A in the first embodiment and the second embodiment, it is not always required that the locking unit 16 lock the doors.

In the autonomous driving devices 100 and 100A in the first embodiment and the second embodiment, when it is specified, through the settings on the navigation system 7 and so on, that the vehicle V performs unmanned autonomous driving, it may be regarded that no driver is detected in the vehicle V. Thus, when it can be predicted in advance that unmanned autonomous driving will be performed, the travel plan that is used for unmanned autonomous driving control can be used for traveling from the time the driver is in the vehicle V. This ability further increases convenience for the driver.

What is claimed is:

1. An autonomous driving device for a vehicle comprising:
   an actuator; and
   an electronic control unit configured to;
     detect presence or absence of a driver in a driver's seat of the vehicle,
     generate a first travel plan, the first travel plan being a travel plan for causing the vehicle to travel autonomously,
     generate a second travel plan, the second travel plan being generated by adding, to the first travel plan, a restriction including at least one of a lane change restriction to prohibit a lane change of the vehicle and a vehicle speed restriction to reduce a speed of the vehicle compared to the first travel plan,
     perform manned autonomous driving control for causing the vehicle to travel autonomously, by using the actuator, with the driver in the vehicle according to the first travel plan when the presence of the driver in the driver's seat is detected, and
     perform unmanned autonomous driving control for causing the vehicle to travel autonomously, by using the actuator, with the driver not in the vehicle according to the second travel plan when the absence of the driver in the driver's seat is detected.

2. The autonomous driving device for the vehicle according to claim 1, further comprising
   a vehicle-dispatch signal receiver configured to receive a vehicle-dispatch signal for causing the vehicle to move to a predetermined destination, wherein
   the electronic control unit is configured to;
     generate a third travel plan when the vehicle-dispatch signal is received by the vehicle-dispatch signal receiver during the unmanned autonomous driving control for the vehicle, and
     perform the unmanned autonomous driving control according to the third travel plan, the third travel plan being a travel plan not including the restriction, the third travel plan being a travel plan for causing the vehicle to travel toward the predetermined destination.

3. The autonomous driving device for the vehicle according to claim 1, wherein the electronic control unit is configured to lock a door of the vehicle before or after a start of the unmanned autonomous driving control when the absence of the driver in the driver's seat is detected.

4. The autonomous driving device for the vehicle according to claim 1, further comprising:
   a vehicle-dispatch signal receiver configured to receive a vehicle-dispatch signal for causing the vehicle to move to a predetermined destination,
   wherein the electronic control unit is configured to perform the unmanned autonomous driving control by using a third travel plan, the third travel plan being a travel plan not including the restriction, the third travel plan being a travel plan for causing the vehicle to travel toward the predetermined destination, when the vehicle-dispatch signal is received by the vehicle-dispatch signal receiver before the unmanned autonomous driving control for the vehicle is performed.

5. The autonomous driving device for the vehicle according to claim 1, wherein the electronic control unit is configured to generate the second travel plan, the second travel plan being generated by adding, to the first travel plan, the restriction including the lane change restriction to prohibit the lane change of the vehicle and the vehicle speed restriction to reduce the speed of the vehicle compared to the first travel plan.

6. An autonomous driving device for a vehicle comprising:
   an actuator; and
   an electronic control unit configured to, detect presence or absence of a driver in a driver's seat of the vehicle, perform manned autonomous driving control according to a pre-generated travel plan when the presence of the driver in the driver's seat is detected, perform unmanned autonomous driving control according to the travel plan when the absence of the driver in the driver's seat is detected, the manned autonomous driving control causing the vehicle to travel autonomously with the driver in the vehicle, the unmanned autonomous driving control causing the vehicle to travel autonomously with the driver not in the vehicle, and perform, by using the actuator, unmanned stop control for causing the vehicle to stop, when a predetermined time has elapsed since a start of the unmanned autonomous driving control or when the vehicle has traveled a predetermined distance since the start of the unmanned autonomous driving control, during the unmanned autonomous driving control.

7. The autonomous driving device for the vehicle according to claim 6, further comprising;

a vehicle-dispatch signal receiver configured to receive a vehicle-dispatch signal for causing the vehicle to move to a predetermined destination, wherein the electronic control unit is configured to;

generate the travel plan that causes the vehicle to travel autonomously, generate the travel plan that causes the vehicle to travel to the predetermined destination when the vehicle-dispatch signal is received by the vehicle-dispatch signal receiver during the unmanned autonomous driving control for the vehicle, and when the vehicle-dispatch signal is received by the vehicle-dispatch signal receiver during the unmanned autonomous driving control for the vehicle, perform the unmanned autonomous driving control, according to the travel plan and not to perform the unmanned stop control.

8. The autonomous driving device for the vehicle according to claim 6, wherein the electronic control unit is configured to lock a door of the vehicle before or after the start of the unmanned autonomous driving control when the absence of the driver in the driver's seat is detected.

9. The autonomous driving device for the vehicle according to claim 6, further comprising:

a vehicle-dispatch signal receiver configured to receive a vehicle-dispatch signal for causing the vehicle to move to a predetermined destination, wherein the electronic control unit is configured not to perform the unmanned stop control when the vehicle-dispatch signal is received by the vehicle-dispatch signal receiver before the unmanned autonomous driving control for the vehicle is performed.

10. The autonomous driving device for the vehicle according to claim 6, wherein the unmanned stop control prevents the vehicle from travelling.

11. An autonomous driving device for a vehicle comprising:

an actuator; and an electronic control unit configured to;

detect presence or absence of a driver in a driver's seat of the vehicle, generate a first travel plan, the first travel plan being a travel plan for causing the vehicle to travel autonomously, generate a second travel plan when the absence of the driver in the driver's seat is detected or when an instruction to cause the vehicle to travel with the driver not in the vehicle is received, the second travel plan being generated by adding, to the first travel plan, a restriction including at least one of a lane change restriction to prohibit a lane change of the vehicle and a vehicle speed restriction to reduce a speed of the vehicle compared to the first travel plan, and perform unmanned autonomous driving control for causing the vehicle to travel autonomously, by using the actuator, according to the second travel plan.

12. The autonomous driving device for the vehicle according to claim 11, further comprising;

a vehicle-dispatch signal receiver configured to receive a vehicle-dispatch signal for causing the vehicle to move to a predetermined destination, wherein the electronic control unit is configured to;

generate a third travel plan when the vehicle-dispatch signal is received by the vehicle-dispatch signal receiver during the unmanned autonomous driving control for the vehicle, and perform the unmanned autonomous driving control according to the third travel plan, the third travel plan being a travel plan not including the restriction, the third travel plan being a travel plan for causing the vehicle to travel toward the predetermined destination.

13. The autonomous driving device for the vehicle according to claim 11, wherein the electronic control unit is configured to lock a door of the vehicle before or after a start of the unmanned autonomous driving control when the absence of the driver in the driver's seat is detected.

14. The autonomous driving device for the vehicle according to claim 11, further comprising:

a vehicle-dispatch signal receiver configured to receive a vehicle-dispatch signal for causing the vehicle to move to a predetermined destination, wherein the electronic control unit is configured to perform the unmanned autonomous driving control for causing the vehicle to travel toward the predetermined destination by using a third travel plan, the third travel plan being a travel plan not including the restriction, the third travel plan being a travel plan for causing the vehicle to travel toward the predetermined destination, when the vehicle-dispatch signal is received by the vehicle-dispatch signal receiver before the unmanned autonomous driving control for the vehicle is performed.

15. The autonomous driving device for the vehicle according to claim 11, wherein the electronic control unit is configured to generate the second travel plan when the absence of the driver in the driver's seat is detected or when the instruction to cause the vehicle to travel with the driver not in the vehicle is received, the second travel plan being generated by adding, to the first travel plan, the restriction including the lane change restriction to prohibit the lane change of the vehicle and the vehicle speed restriction to reduce the speed of the vehicle compared to the first travel plan.

* * * * *